United States Patent
Konno et al.

(10) Patent No.: US 7,369,035 B2
(45) Date of Patent: May 6, 2008

(54) MOTORCYCLE ELECTRONIC KEY SYSTEM

(75) Inventors: Takeshi Konno, Iruma (JP); Akira Komaki, Asaka (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 9 days.

(21) Appl. No.: 10/854,411

(22) Filed: May 26, 2004

(65) Prior Publication Data
US 2004/0217846 A1    Nov. 4, 2004

Related U.S. Application Data

(63) Continuation of application No. PCT/JP03/12273, filed on Sep. 25, 2003.

(30) Foreign Application Priority Data

Sep. 27, 2002   (JP)   ............... 2002-282408
Sep. 30, 2002   (JP)   ............... 2002-285849

(51) Int. Cl.
  *B60R 25/00*   (2006.01)
  *G05B 19/00*   (2006.01)
  *G06F 7/00*    (2006.01)
  *G08B 29/00*   (2006.01)
  *H04B 1/00*    (2006.01)

(52) U.S. Cl. ............... 340/5.73; 340/5.72; 180/220

(58) Field of Classification Search ............... 340/5.72, 340/5.73, 5.61–5.62, 425.5, 427; 318/139; 180/220
See application file for complete search history.

(56) References Cited

U.S. PATENT DOCUMENTS

| | | | |
|---|---|---|---|
| 4,381,042 A * | 4/1983 | Perry | ............... 180/272 |
| 5,343,077 A * | 8/1994 | Yoshida et al. | ............... 340/5.64 |
| 5,594,411 A * | 1/1997 | Ono | ............... 340/425.5 |
| 5,689,142 A | 11/1997 | Liu | |
| 5,730,243 A * | 3/1998 | Koike et al. | ............... 180/220 |
| 5,736,935 A * | 4/1998 | Lambropoulos | ....... 340/825.69 |
| 5,844,470 A * | 12/1998 | Garnault et al. | ........... 340/5.62 |
| 5,939,975 A * | 8/1999 | Tsuria et al. | ........... 340/426.18 |
| 5,972,299 A * | 10/1999 | Huang et al. | ............... 422/173 |
| 6,040,763 A | 3/2000 | Nakajima | |
| 6,057,657 A | 5/2000 | Kitamura | |

(Continued)

FOREIGN PATENT DOCUMENTS

CN    1172887 A    2/1998

(Continued)

*Primary Examiner*—Brian Zimmerman
*Assistant Examiner*—Nam Nguyen
(74) *Attorney, Agent, or Firm*—Carrier, Blackman & Associates, P.C.; William D. Blackman; Joseph P. Carrier

(57) ABSTRACT

In an electronic key system for a motorcycle including the control unit mounted on a specific vehicle and a mobile transmitter-receiver carried by a user, the specific vehicle includeing an openable and closable seat on which the user sits, and is provided with a start switch used for starting the control unit in the seat. More specifically, the start switch is installed on, for example, the left side surface inside the user's seat at the position corresponding to the portion which the user may touch when opening the seat. An operating element of the start switch opposes the back surface of the superficial skin on the left side of the seat.

9 Claims, 14 Drawing Sheets

U.S. PATENT DOCUMENTS

| | | |
|---|---|---|
| 6,236,850 B1 | 5/2001 | Desai |
| 6,774,789 B2 | 8/2004 | Inaba et al. |
| 7,196,612 B2 | 3/2007 | Sumada et al. |
| 2004/0217846 A1 | 11/2004 | Konno et al. |

FOREIGN PATENT DOCUMENTS

| | | | |
|---|---|---|---|
| DE | 10034348 | | 1/2002 |
| EP | 0860353 | | 8/1998 |
| EP | 1 211 170 A2 | | 10/2001 |
| EP | 1 211 170 A2 | | 6/2002 |
| EP | 1445180 | | 8/2004 |
| FR | 2751293 | | 1/1998 |
| JP | 60-117824 | | 6/1985 |
| JP | 01-164682 | | 6/1989 |
| JP | 03-021575 | | 1/1991 |
| JP | 04-183690 | | 6/1992 |
| JP | 04-331647 | | 11/1992 |
| JP | 06-092281 | | 4/1994 |
| JP | 07-180408 | | 7/1995 |
| JP | 07-324533 | | 12/1995 |
| JP | 1995324533 | * | 12/1995 |
| JP | 09-044229 | | 2/1997 |
| JP | 10-317754 | | 12/1998 |
| JP | 11-241539 | | 9/1999 |
| JP | 11-334665 | | 12/1999 |
| JP | 2001-012123 | | 1/2001 |
| JP | 2001-278142 | | 10/2001 |
| JP | 2001-278156 | | 10/2001 |
| JP | 2001-279975 | | 10/2001 |
| JP | 2001278156 | * | 10/2001 |
| JP | 2001-349110 | | 12/2001 |
| JP | 2001-349117 | | 12/2001 |
| JP | 2002-057564 | | 2/2002 |
| JP | 2002-225760 | | 8/2002 |
| WO | WO 02/29734 | | 4/2002 |

* cited by examiner

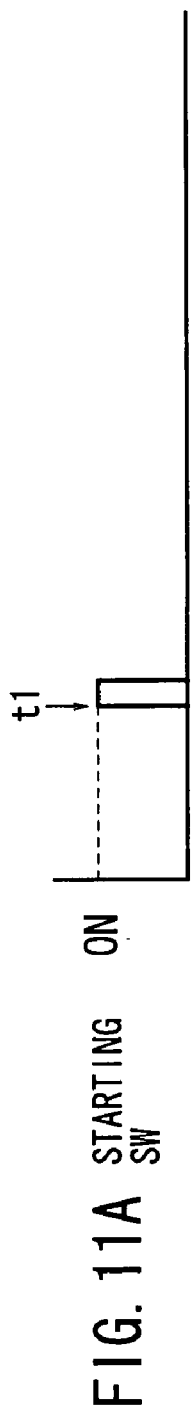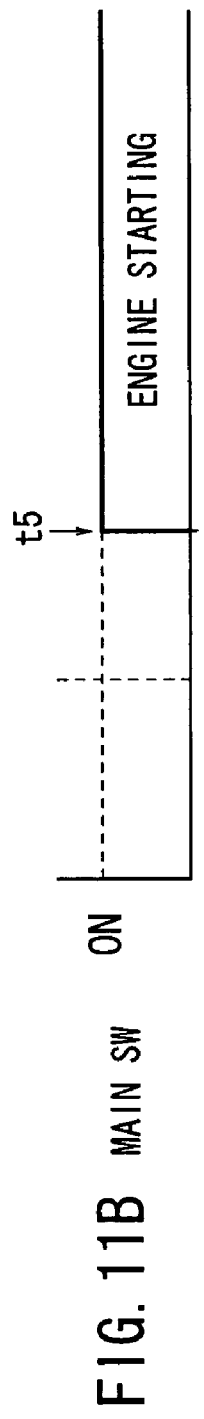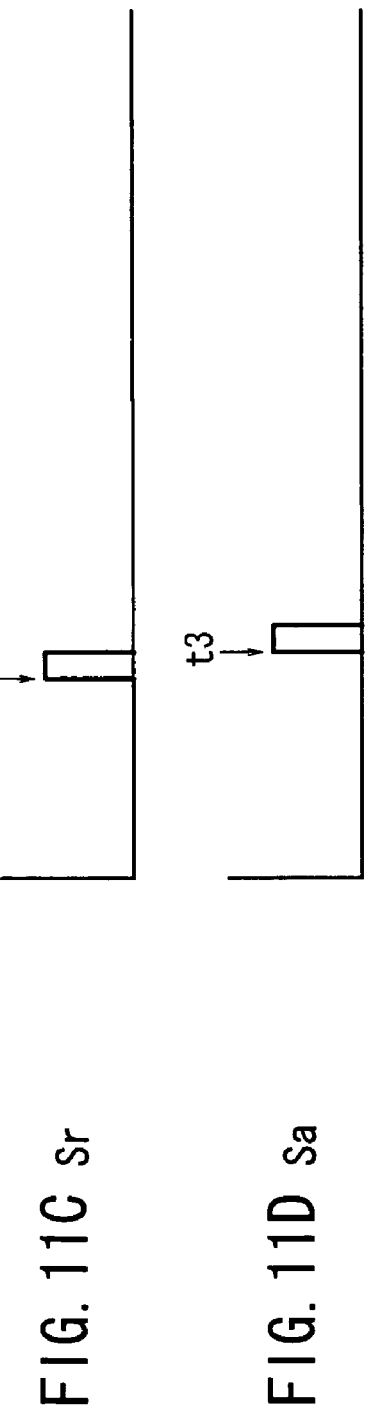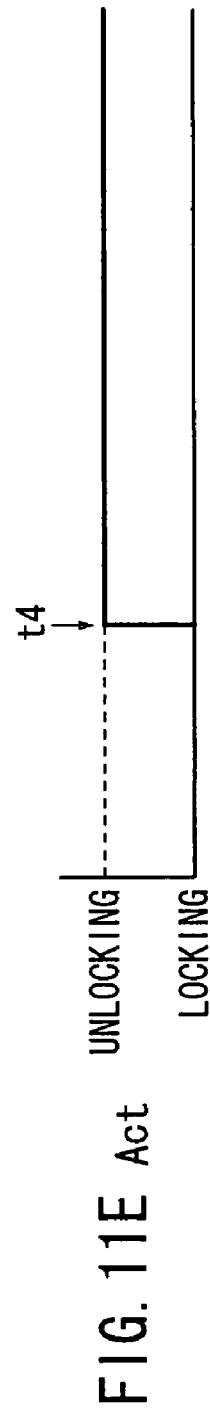
FIG. 11A STARTING SW
FIG. 11B MAIN SW
FIG. 11C Sr
FIG. 11D Sa
FIG. 11E Act

MOTORCYCLE ELECTRONIC KEY SYSTEM

CROSS-REFERENCE TO RELATED APPLICATIONS

The present application is a continuation of International Patent Application Ser. No. PCT/JP03/12273, filed 25 Sep. 2003, with a priority date of 27 Sep. 2002 (now abandoned).

TECHNICAL FIELD

The present invention relates to an electronic key system for a motorcycle, which starts an engine only when it is identified that a request is fed from a qualified user as a result of verification of an ID from wireless communication between a transmitter-receiver or a transmitter (electronic key) that the user carries and a control unit mounted on a specific vehicle.

BACKGROUND ART

There are electronic key systems for a specific vehicle as disclosed in Japanese Laid-Open Patent Publication No. 2001-349110 and Japanese Laid-Open Patent Publication No. 2001-349117. In the electronic key systems for a vehicle in Japanese Laid-Open Patent Publication No. 2001-349110 and Japanese Laid-Open Patent Publication No. 2001-349117, an actuating unit (switch) is installed on the door handle or on the trunk lid of the specific vehicle, and when an user operates (actuates) the actuating unit, communication with the electronic key is started and an ID transmitted from the electronic key is verified against an ID registered in the control unit. When it is proved that the result showing that the IDs are identical is obtained, the door lock or the like is released.

In the related art, there is also proposed an electronic key system in which a transmitting antenna is provided on each door of a four-wheeled vehicle, and only the door towards which a mobile machine approaches can be unlocked independently of the other doors of the vehicle (For example, Japanese Laid-Open Patent Publication No. 10-317754).

Furthermore, an electronic key system for a motorcycle has been proposed in which communication between a transmitter-receiver that a user carries and an immobilizer, which has been installed on a specific vehicle can be started by inserting a key into a key cylinder installed on the specific vehicle (For example, Japanese Laid-Open Patent Publication No. 2001-12123).

When such electronic key system is adapted to be used on a motorcycle, an actuating unit, corresponding to the actuating unit (switch) which has been installed on the door handle of the four-wheeled vehicle, must be mounted somewhere on the motorcycle. In particular, when it is applied to a motorcycle having a storage space for a helmet under an openable and closable seat, considering an actuating operation or an action of taking in and out the user's helmet or the like, it is desirable to install the actuating unit at a position the user can naturally access such as on a seat.

SUMMARY OF THE INVENTION

In view of such subject described above, an object of the present invention is to provide an electronic key system for a motorcycle in which the control unit can be actuated smoothly in a series of steps preformed by the user, when preparing to ride on the specific vehicle, and to improve the operability of actuation by the electronic key.

An electronic key system for a motorcycle according to a first aspect of the present invention is an electronic key system for a motorcycle including a control unit for mounting to a specific vehicle, a mobile transmitter-receiver for being carried by a user, wherein to specific vehicle includes an openable and closable seat on which the user sits, and a locking unit for locking the seat against the opening operation until an unlock instruction is supplied. The control unit hereof includes a unit for supplying a request signal to the mobile transmitter-receiver only after the turning-ON operation of a start switch installed in the seat or in the vicinity of the seat, a signal detector for detecting a response signal based on the request signal transmitted from the mobile transmitter-receiver, and a control mechanism for supplying an unlock instruction to the locking unit when it is identified tba a request is fed from a qualified user as a result of verification of the response signal. The start switch may include an operating element which is activated by being manually engaged by a user.

When the user prepares to ride on the specific vehicle, the user performs an action to take a helmet out from storage under the openable and closable seat. In this case, since the start switch is provided in the seat or in the vicinity of the seat, the start switch can be easily operated by performing an operation included in a series of operations performed by the user when preparing for riding on the specific vehicle, which may include pushing a part of the seat, whereby operability is improved.

In addition, since the start switch is provided at a concealed position that cannot be viewed from the outside, a person other than the qualified user cannot find the start switch easily, and thus the system is also effective for protecting against theft.

An electronic key system for a motorcycle according to a second aspect of the present invention is an electronic key system for a motorcycle including a control unit for mounting to a specific vehicle, and a mobile transmitter for being carried by a user, wherein the specific vehicle includes an openable and closable seat on which the user sits, and a locking unit for locking the seat against the opening operation until an unlock instruction is supplied, the mobile transmitter including a signal generator for supplying a request signal to the control unit based on the usets input, the control unit including a receiver far receiving a request signal from the mobile transmitter only after a turning-ON operation of a start switch installed in the seat or in the vicinity of the seat, and a control mechanism for supplying an unlock insiniclion to the locking unit when it is identified that a request is fed from a qualified user, as a result of verification of the request signal. The start switch may include an operating element which is activated by beinir manually engaged by a user.

In this case as well, the control unit can be actuated smoothly by a series of operations of the user when preparing for riding on the specific vehicle, and thus improving operability of the actuation by the electronic key.

In the invention described above, it is also possible to provide a power interrupt switch for stopping a power supply at least to the circuit system of the control unit, which performs communication, when the specific vehicle is not actuated for a predetermined period, and a power supply for supplying power to the circuit system based on the turning-ON operation of the start switch.

Accordingly, when the specific vehicle is not actuated for a predetermined period, the power supply to the communication-related circuit is stopped until the start switch is turned ON subsequently, whereby power consumption is significantly reduced during waiting time.

In addition, since communication with the outside (such communication may include communication with the mobile transmitter-receiver or reception of a request signal from the mobile transmitter) is not performed unless the start switch is turned ON, and the start switch cannot be found easily, it is also effective for protecting against theft.

In the invention described above, it is also possible to provide an interruptible connection for supplying power intermittently at least to the circuit system of the control system, which performs communication, when the specific vehicle has not been activated for a predetermined period, and a conduit for supplying power constantly to the circuit system based on the turning-ON operation of the start switch.

Accordingly, when the specific vehicle has not been actuated for a predetermined period, the power supplied to the communication related circuit is performed intermittently until the start switch is turned ON, whereby reducing power consumption during waiting time.

In the invention described above, an operating element of the start switch may be provided so as to oppose the back surface of the superficial skin of the seat. In this case, by pressing the portion of the superficial skin of the seat corresponding to the portion where the operating element of the start switch is located, the start switch can easily be turned ON.

Normally, when opening a seat on a motorcycle, two actions (two behaviors), including the steps of unlocking the seat by operating the start switch and lifting the seat, are necessary. However, by providing the operating element of the start switch so as to oppose the back surface of the superficial skin on the side surface of the seat (including the surface at the back of the seat), the start switch can be operated simultaneously with touching the seat in order to open the seat. Therefore, the operation of activating the start switch to lifting of the seat can be performed by one behavior, thereby improving usability.

In the invention described above, the start switch may be provided on a handle, located at a position at the side of a user's seat, which may be used at least for manually opening and closing the user's seat. In this case, when a helmet which has been stored under the openable and closable seat is taken out, an action to grip the handle and lift the seat up is performed. When performing the above-described action, the start switch can easily be operated if the start switch is located in the seat handle, and thus it is advantageous for improving operability.

In particular, by disposing the start switch on a handle at the position at the side of the seat, the start switch may be provided at a position where the user touches naturally when opening the seat, thereby increasing usability.

The above and other objects features and advantages of the present invention will become more apparent from the following description when taken in conjunction with the accompanying drawings in which a selected illustrative embodiment of the present invention is shown by way of illustrative example.

BRIEF DESCRIPTION OF THE DRAWINGS

FIG. 11A to FIG. 11E are timing charts showing an example of a processing of the electronic key system according to the first embodiment.

DETAILED DESCRIPTION

Referring now to FIG. 1 through FIG. 14, a number of specific embodiments will be described in which an electronic key system for a motorcycle, according to the present invention, is applied to a scooter.

Figure 1:
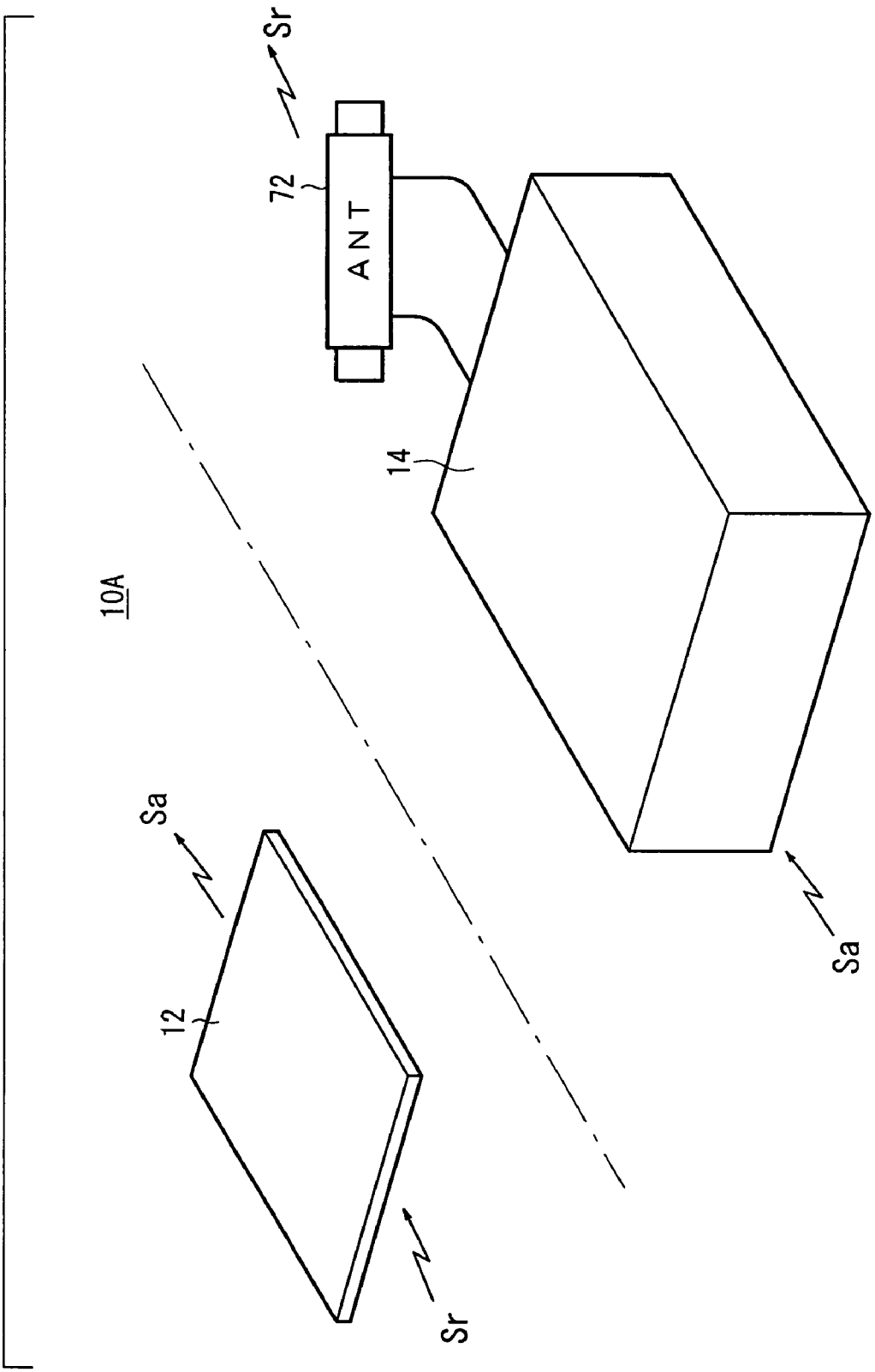
FIG. 1 is a simplified perspective drawing showing a construction of an electronic key system according to a first embodiment.
Figure 7:
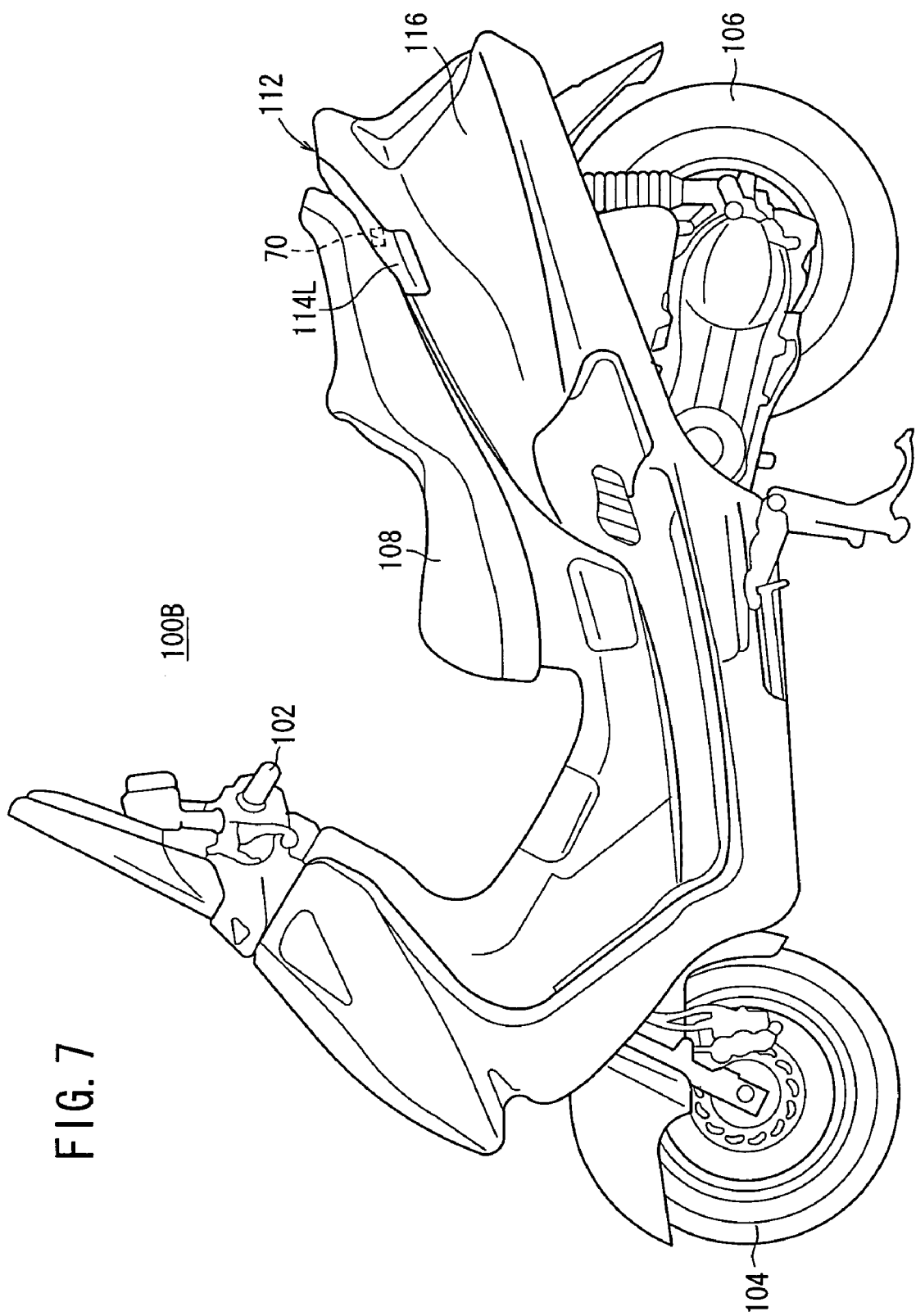
FIG. 7 is a side plan view of a motorcycle showing another example of the electronic key system hereof in a specific vehicle.

An electronic key system 10A according to a first embodiment includes, as shown in FIG. 1, a mobile transmitter-receiver 12 that a user carries, and a control unit 14 mounted to a specific vehicle 100A (See FIG. 4) or a specific vehicle 100B (See FIG. 7). The mobile transmitter-receiver 12 may be formed in a key-shape and including an IC chip integrated therein, or alternatively, may be formed in a card-shape and including an IC chip integrated therein. However, when it is applied mainly as a keyless system, a card-shape is employed. In this embodiment, the mobile transmitter-receiver 12 of a card-shape is assumed for purposes of the present description. Since the mobile transmitter-receiver 12 may be referred to as an electronic key, the mobile transmitter-receiver is referred to as electronic key 12 in the description below.

The electronic key 12 has a card-shape as described above and, as shown in FIG. 2, includes a battery 20, a power supply circuit 22, a CPU 24, a receiving circuit 26, and a transmitting circuit 28.

The power circuit 22 is a circuit for supplying power from the battery 20 to the receiving circuit 26, the transmitting circuit 28, and the CPU 24. The receiving circuit 26 includes a receiving antenna, not shown, which receives a request signal Sr or the like transmitted from the control unit 14 through the receiving antenna, and the receiving antenna takes the signal out from a carrier wave and demodulates the same. The demodulated signal is supplied to the CPU 24. The frequency of the carrier wave of the request signal Sr may range from 100 kHz to 300 kHz.

The CPU 24 performs at least two steps (a request signal verifying routine 30 and a response signal generating routine 32). The request signal verifying step 30 verifies whether or not the signal supplied from the receiving circuit 26 is the request signal Sr, and if it is the request signal Sr, control is transferred from the CPU to the response signal generating routine 32. The response signal generating routine 32 reads ID data stored in a ROM, not shown, based on a request from the request signal verifying routine 30, adds an attribute indicating response to the ID data, and outputs it to the transmitting circuit 28 as transmitting data Dt. The transmitting circuit 28, which includes a transmitting antenna, modulates the carrier wave based on the transmitting data Dt supplied from the CPU 24, and transmits it as a response signal Sa through the transmitting antenna. The frequency of the carrier wave of the response signal Sa may range from 200 MHz to 500 MHz.

Figure 3:
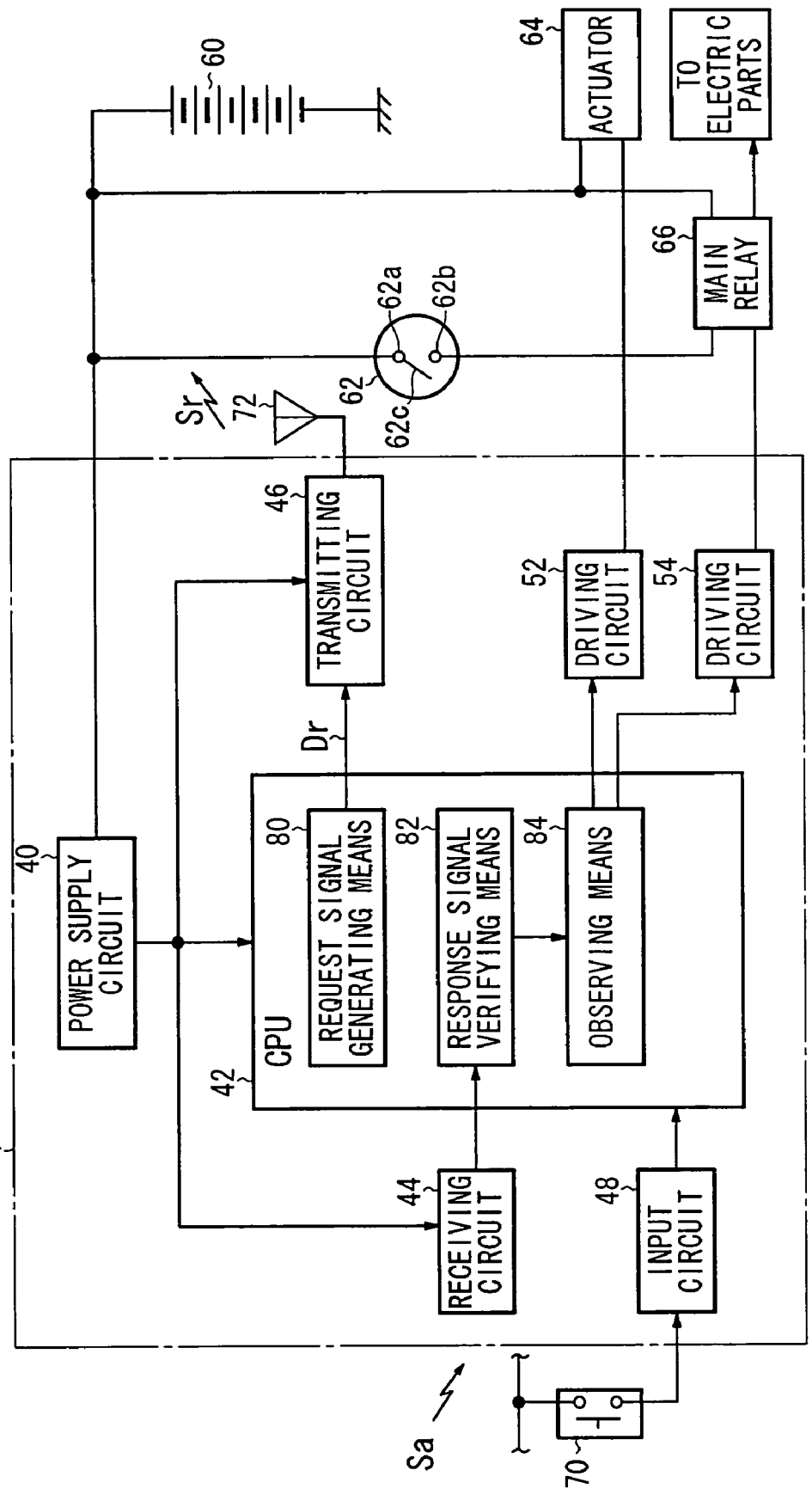
FIG. 3 is a schematic block diagram showing a construction of a control unit in the electronic key system according to the first embodiment.

On the other hand, the control unit 14 mounted to the specific vehicle 100A or 100B is constructed of, for example, a system LSI, which includes a power circuit 40, a CPU 42, a receiving circuit 44, a transmitting circuit 46, an input circuit 48, a first driving circuit 52 (for driving an actuator) and a second driving circuit 54 (for driving a main relay) as shown in FIG. 3. In the periphery of the control unit 14, at least a battery 60, a main switch 62, a seat actuator (a driving source of the locking unit) 64, a main relay 66, a start switch 70, and a transmitting antenna 72 are provided.

The main switch 62 includes two fixed contacts 62a and 62b and one movable contact 62c. One fixed contact 62a is connected to the battery 60, and the other fixed contact 62b is connected to the main relay 66.

A start switch 70 is connected to the input circuit 48, and a state of either ON or OFF of the start switch 70 is supplied to the CPU 42 through the input circuit 48.

Figure 4:
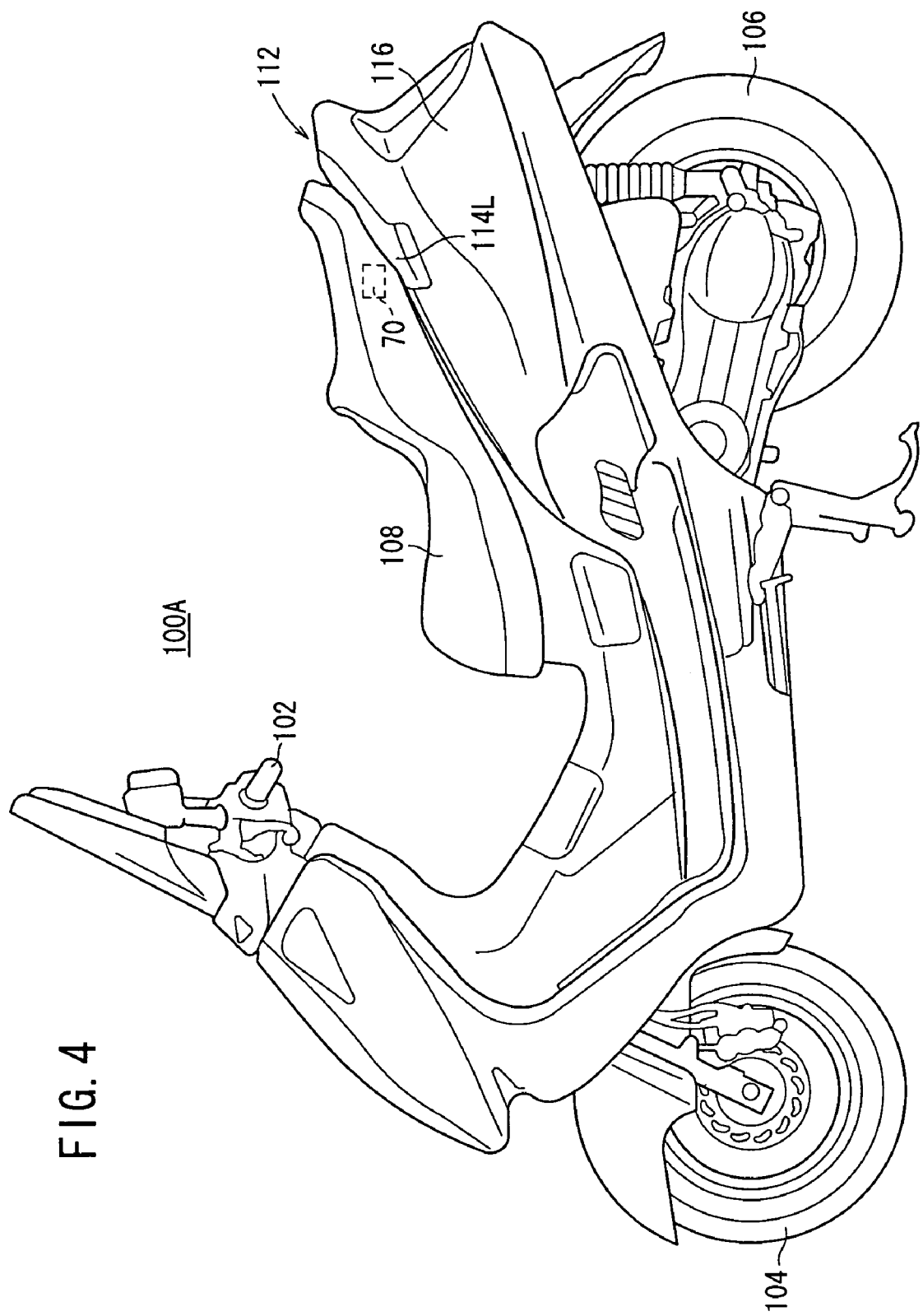
FIG. 4 is a side plan view showing a motorcycle incorporating one example of the electronic key system hereof in a specific vehicle.
Figure 5:
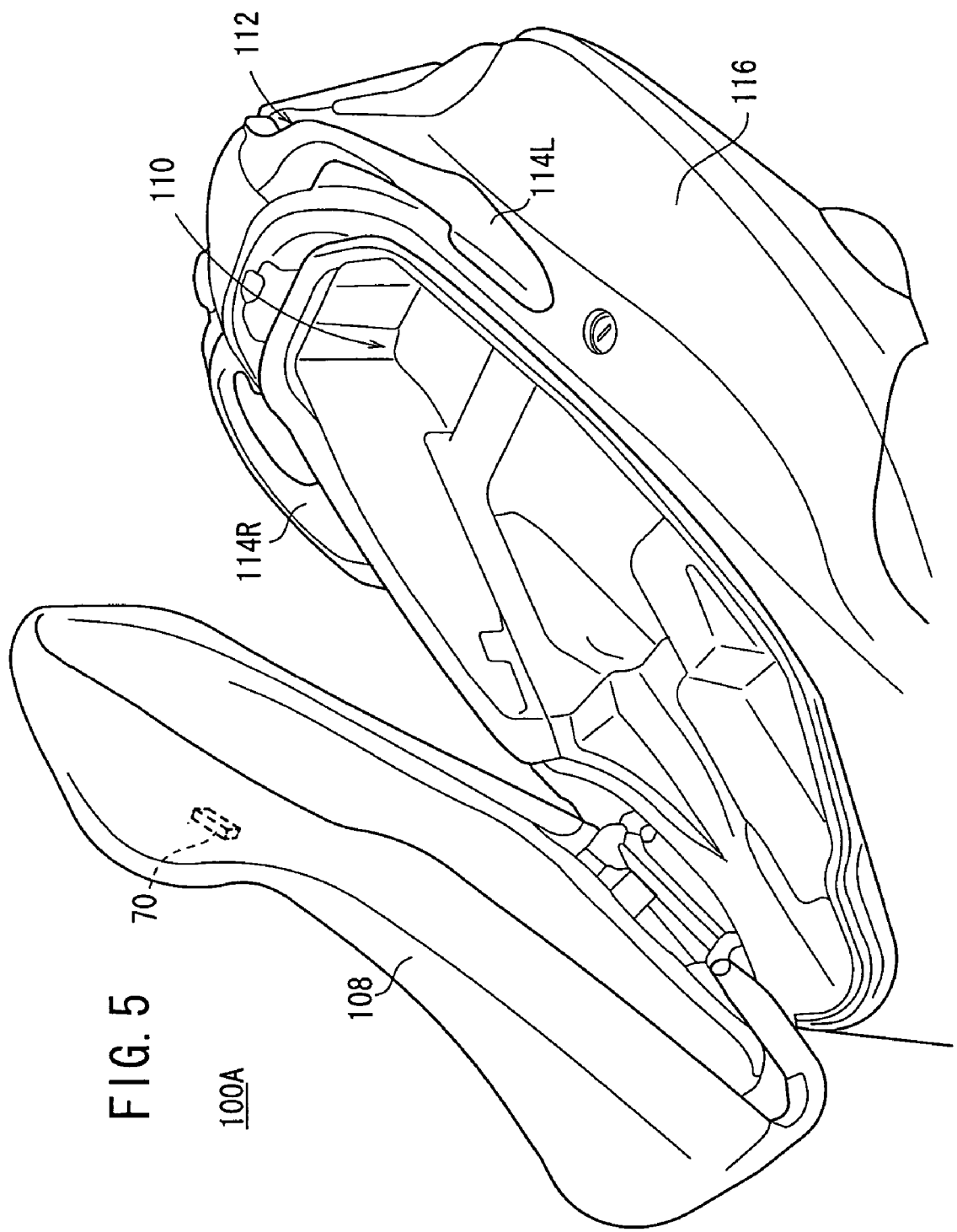
FIG. 5 is an explanatory detail drawing of part of the motorcycle of FIG. 4, showing a state in which the seat of the specific vehicle (See FIG. 4) is opened.
Figure 8:
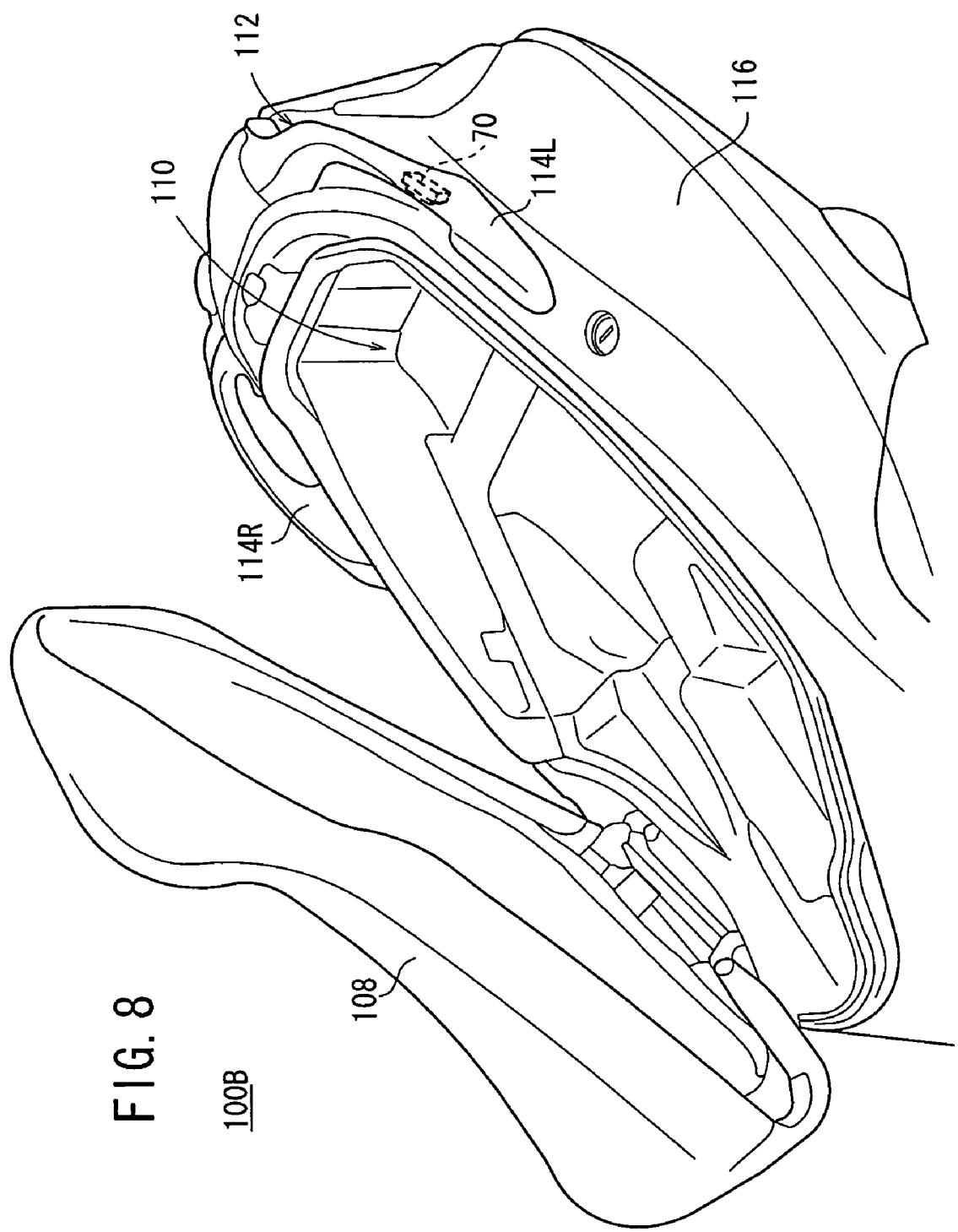
FIG. 8 is an explanatory detail drawing of part of the motorcycle of FIG. 7, showing a state in which the seat of the specific vehicle (See FIG. 7) is opened.

In a first embodiment, the scooter as shown in FIG. 4 and FIG. 7 are assumed as the specific vehicle 100A or 100B. Either of the specific vehicles 100A or 100B include a handle bar 102, a front wheel 104, a rear wheel 106 and, in addition, an openable and closable seat 108 on which the user sits. A space 110 for storing a user's helmet is provided under the seat 108 as shown in FIG. 5 and FIG. 8. Normally, when not riding on the specific vehicle, a user's helmet is stored in the space 110.

A handle 112 (referred to as seat handle 112 for differentiating from the handle bar 102 used by the driver for steering) to be used at least for manually opening and closing the seat 108 is provided around the rear portion of the seat 108. The seat handle 112 is provided with two bars (left bar 114L and right bar 114R). The left bar 114L is provided from the left side of the rear portion of a vehicle body 116 along the left side surface of the rear portion of the seat 108, and the right side bar 114R is provided from the right side of the rear portion of the vehicle body 116 along the right side surface of the rear portion of the seat 108.

Then, when the user opens or closes the seat 108, for example, the seat 108 can be opened or closed by gripping the left bar 114L and pressing the vehicle body 116 downward.

In the case where the specific vehicle 100A or 100B are built for two, the seat handle 112 is designed so that the person sitting on the rear portion of the seat 108 (not the driver) can grip the seat handle 112 to maintain his/her posture stable when the specific vehicle 100A or 100B are traveling.

In the case where the seat handle 112 is mounted to the rear portion of the seat 108, not on the vehicle body 116, the user can grip, for example, the left bar 114L when the user opens or closes the seat 108.

Figure 6:
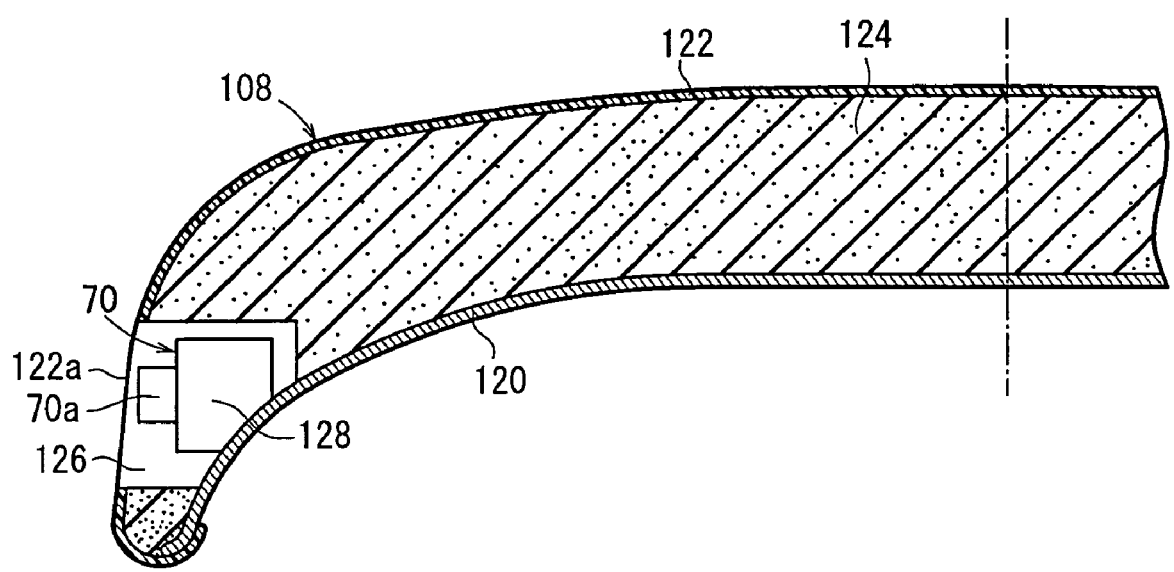
FIG. 6 is a cross sectional view showing a construction of a seat with part of it omitted.

In the specific vehicle 100A, as shown in FIG. 4 to FIG. 6, the start switch 70 is provided in the seat 108.

More specifically, the seat 108 includes a bottom plate 120, formed, for example, of metal or synthetic resin, located at the bottom thereof, and a urethane material 124 is filled between the bottom plate 120 and a superficial skin 122 as shown in FIG. 6.

The start switch 70 may be stored in a storage space 126 formed in the urethane material 124, and a housing 128 of the start switch 70 is fixed to the bottom plate 120 with a fastener, for example, a screw, etc. The start switch 70 may be installed on, for example, the left side surface inside the seat 108 at a position corresponding to the portion which the user touches when opening the seat 108.

An operating element 70a of the start switch 70 opposes the back surface of a superficial skin 122a on the left side surface of the seat 108. The distance between the distal end of the operating element 70a and the back surface of the superficial skin 122a is determined to such distance that the start switch 70 is turned ON when the user presses the superficial skin 122a on the left side surface of the seat 108 for the purpose of opening the seat 108. In the example described above, the start switch 70 is provided on the left side surface of the seat 108. However, it may be provided either on the right side surface of the seat 108 or on both of the left side surface and the right side surface.

Figure 9:
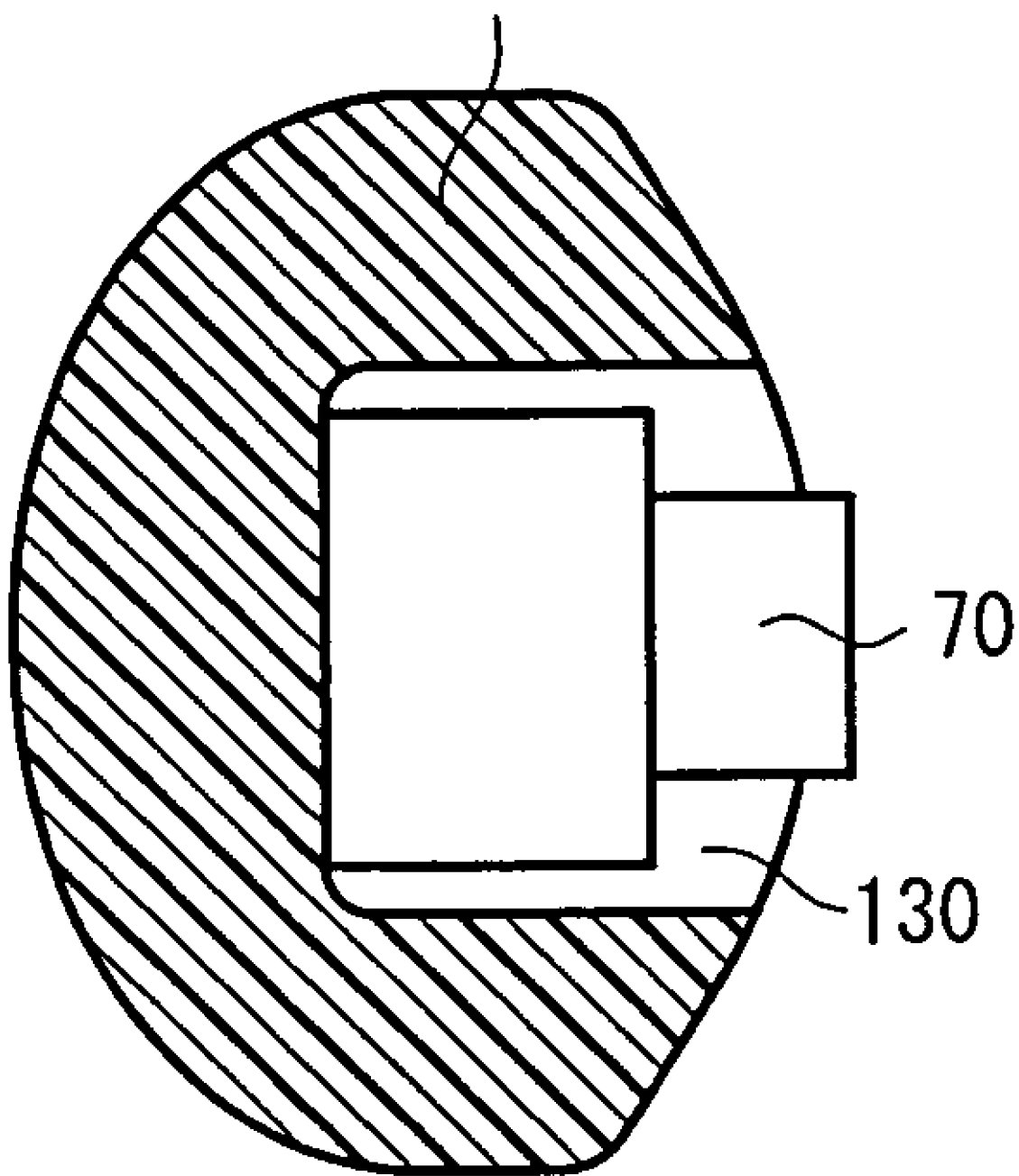
FIG. 9 is an explanatory drawing showing an example of a method of installing the start switch.

In the specific vehicle 100B, as shown in FIG. 7, the start switch 70 is provided on the seat handle 112. More specifically, as shown in FIG. 8 and FIG. 9, a recess 130 is formed at the lengthwise center of the left bar 114L and/or the right bar 114R at the position opposing the rear portion of the seat 108, and the start switch 70 is provided in the recess 130, so that the start switch 70 is integrated with the left bar 114L and/or the right bar 114R.

Normally, when gripping, for example, the left bar 114L, the lengthwise center thereof is gripped. Since the start switch 70 is provided at this position as described above, the hand of the user touches the start switch 70 naturally when operating the seat handle 112.

As shown in FIG. 3, the power circuit 40 in the control unit 14 supplies power from the battery 60 to the CPU 42, the receiving circuit 44, and the transmitting circuit 46.

The receiving circuit 44 has a receiving antenna, which receives a response signal Sa or the like transmitted from an electronic key 12 through the receiving antenna, takes the signal out from the carrier wave and demodulates the same. The demodulated signal is supplied to the CPU 42.

The CPU 42 performs at least three steps (a request signal generating routine 80, a response signal verifying routine 82, and an observing routine 84).

The request signal generating routine 80 read request data Dr (data which is a source of the request signal Sr) from a ROM, not shown, based on the start switch 70 being turned to the ON position, and supplies it to the transmitting circuit 46.

The transmitting circuit 46 modulates the carrier wave based on the request data Dr supplied from the CPU 42 and transmits it through the transmitting antenna 72 as the request signal Sr.

Figure 10A:
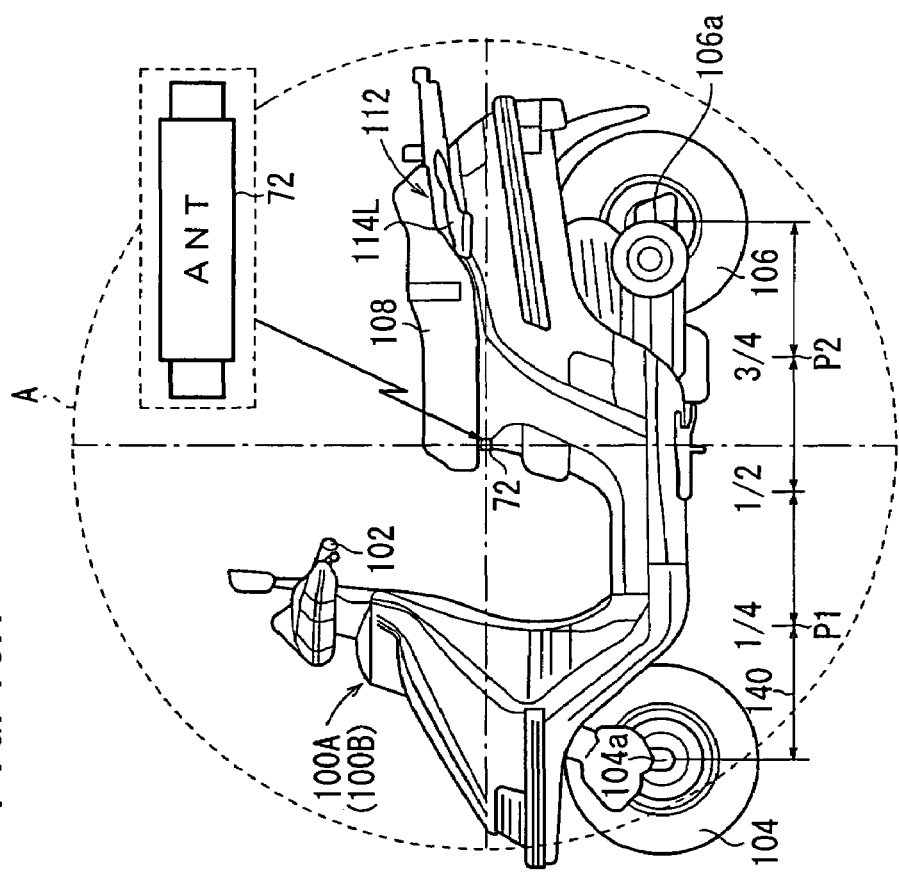
FIG. 10A is a side plan view of a motorcycle showing an example of the position of the specific vehicle to which a transmitting antenna is installed.
Figure 10B:
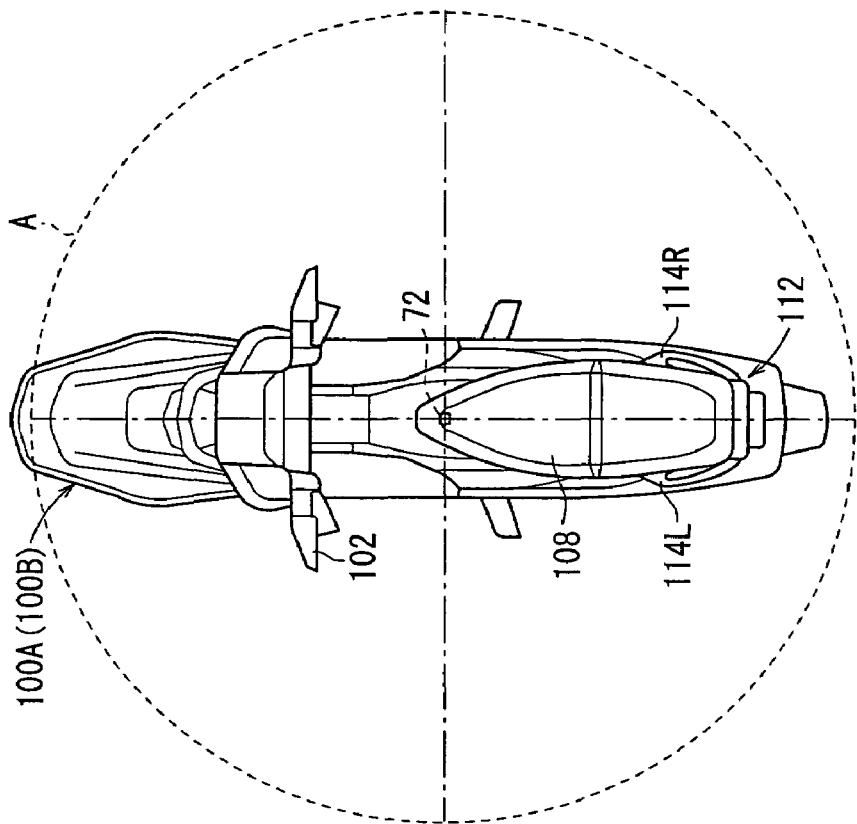
FIG. 10B is a top plan view of the motorcycle of FIG. 9.

The range in which the request signal Sr can be transmitted, as shown in FIG. 10A and FIG. 10B, is a spherical range of 1 to 1.5 m in radius about the transmitting antenna 72 which is mounted to the specific vehicle 100A or 100B (range shown by a circle A in FIG. 10A and FIG. 10B), and is smaller than the range in which the response signal Sa can be transmitted (the range of the response signal is several meters in radius about the electronic key 12).

Therefore, when the scooter is assumed as either the specific vehicle 100A or 100B, in order to ensure communication with the electronic key 12 that the user carries when riding on the specific vehicle, or when the user is opening the seat 108, it is desired to install the transmitting antenna 72, for example, at the position near the center of the specific vehicle 100A or 100B as shown in FIG. 10A and FIG. 10B.

The position near the center of the specific vehicle 100A or 100B means the area from a point P1, which is at one-fourth of the line segment 140 between the center 104a of the front wheel 104 and the center 106a of the rear wheel 106 to a point P2, which is at three-fourth of the same line segment, for example, from the center 104a of the front wheel 104. This point is similar even if there is a different type of autobicycle which is not illustrated. In a first embodiment, the transmitting antenna 72 is installed at the position near the front portion of the seat 108.

The response signal verifying routine 82 verifies whether or not the signal supplied from the receiving circuit 44 is the response signal Sa, and if it is the response signal Sa, verifies whether or not ID data contained in the response signal Sa is identical to the ID data registered in a memory, not shown.

The observing routine 84 observes the presence of arrival of the response signal Sa (whether or not conformity of ID was detected by the response signal verifying means 82) based on the output of the request signal Sr. From the time point when the request data Dr is outputted, the request signal generating routine 80 enters into a standby state waiting for input of the response signal Sa. When the response signal Sa arrives within a predetermined time period, it outputs an unlock signal to the first driving circuit 52 and a turn ON signal to the second driving circuit 54.

The first driving circuit 52 drives the actuator 64 based on input of the unlock signal from the CPU 42, and unlocks the handle bar 102 and the seat 108. With this unlocking operation, steering by the handle bar 102 is enabled, and the seat 108 is moved slightly upward, so that the user can easily recognize that the handle bar 102 and the seat 108 are unlocked.

The second driving circuit 54 is turned ON based on input of the turn ON signal from the CPU 42, and then when the main relay 66 is turned ON by the main switch 62 being turned ON, the engine starts and thus the specific vehicle is enabled to travel.

When the main switch 62 is turned OFF, the main relay 66 is also turned OFF and the engine is stopped simultaneously. When the locking operation is performed, or, for example, when the handle bar 102 and the seat 108 are positioned in the locked state, after the user's helmet is stored in the space 110, under the seat 108, the verification of the response signal Sa in the control unit 14 is stopped, and the second driving circuit 54 is turned OFF.

Referring now to the timing chart shown in FIG. 11A to FIG. 11E, a typical processing of the electronic key system 10A according to a first embodiment will be described. Though the request signal Sr is a signal having a pulse train based on the request data Dr, and the response signal Sa is a signal having a pulse train based on data containing ID data, those signal trains are represented as a signal of one pulse in FIG. 11A to FIG. 11E in order to simplify the description.

At the time point t1 in FIG. 11A, when the start switch 70 is turned ON with the electronic key 12 held by the user, as shown in FIG. 11C, a request signal Sr is transmitted from the control unit 14 (see the time point t2), and communication with the electronic key 12 is started.

When the electronic key 12 is held by the user, a request signal Sr is received through the receiving circuit 26 (See FIG. 2) of the electronic key 12. The electronic key 12 transmits a response signal Sa based on reception of the request signal Sr, as shown in FIG. 11D (See the time point t3). The response signal Sa is supplied to the CPU 42 through the receiving circuit 44 of the control unit 14 (See FIG. 3), and ID data contained in the response signal Sa is verified. When the ID data is determined to be identical, as shown in FIG. 11E, the locked state of the handle bar 102 and the seat 108 is released (the seat is unlocked) through the control unit 14 and the first driving circuit 52 (at the time point t4). At this time, the second driving circuit 54 is turned ON.

Subsequently, when the main switch 62 is turned ON at the time point t5 in FIG. 11B, the engine starts and the specific vehicle is enabled to travel.

In the electronic key system 10A according to a first embodiment, the start switch 70 is provided in the seat 108 or on the seat handle 112. Normally, when the user rides on the specific vehicle 100A or 100B, an action to remove a user's helmet which has been stored under the openable and closable seat 108 is performed. In this case, the action to hold the seat 108 or to grip the seat handle 112 and lift the seat 108 upward is performed. When performing this action, the start switch 70 can easily be operated. Therefore, operability regarding starting of the electronic key system 10A is improved.

In addition, since the start switch 70 is provided at a position which cannot be viewed from the outside, a person other than the qualified user cannot find the start switch 70 easily, and thus it is also effective for protecting against theft.

In the specific vehicle 100A, since the operating element 70a of the start switch 70 is provided so as to oppose the back surface of the superficial skin 122 of the seat 108, the start switch 70 can easily be operated by pressing the portion of the superficial skin 122 of the seat 108 corresponding to the portion where the operating element 70a of the start switch 70 is located.

In other words, when normally opening a seat 108, two actions (two behaviors) including the steps of unlocking the seat 108 by operating the start switch 70 and lifting the seat 108 are necessary. However, since the operating element 70a of the start switch 70 is provided so as to oppose the back surface of the superficial skin 122a, for example, of the left side surface of the seat 108, the start switch 70 can be operated by touching the seat 108 and thus simultaneously opening the seat 108. Therefore, the operation of activating the start switch 70 to the lifting of the seat 108 can be performed by one behavior, thereby improving usability.

On the other hand, in the specific vehicle 100B, since the start switch 70 is provided at the lengthwise center of the left bar 114L and/or the right bar 114R at the position opposing the seat 108, the form in which the start switch 70 is provided at the position where the user naturally touches when opening the seat 108 is achieved, thereby usability is improved.

Since the recess 130 is formed on the lengthwise center of the left bar 114L and/or the right bar 114R at the position opposing the rear portion of the seat 108, and the start switch 70 is provided in the recess 130 such that the start switch 70 is integrated with the left bar 114L and/or the right bar 114R, advantages such as downsizing, lightweight, and low cost maybe obtained.

In addition, since the seat handle 112 can be mounted to the vehicle body 116 after assembly, it is not necessary to modify the configuration of the vehicle body 116 or to modify the wiring route significantly for providing the start switch 70. Therefore, the control unit 14 can be mounted through a slight modification in design, which is advantageous in terms of costs.

The start switch 70 employed may be a mechanical contact type as described above, a capacitance touch switch, a switch employing a principle of piezoelectric device or, a switch utilizing a Hall element.

Figure 2:
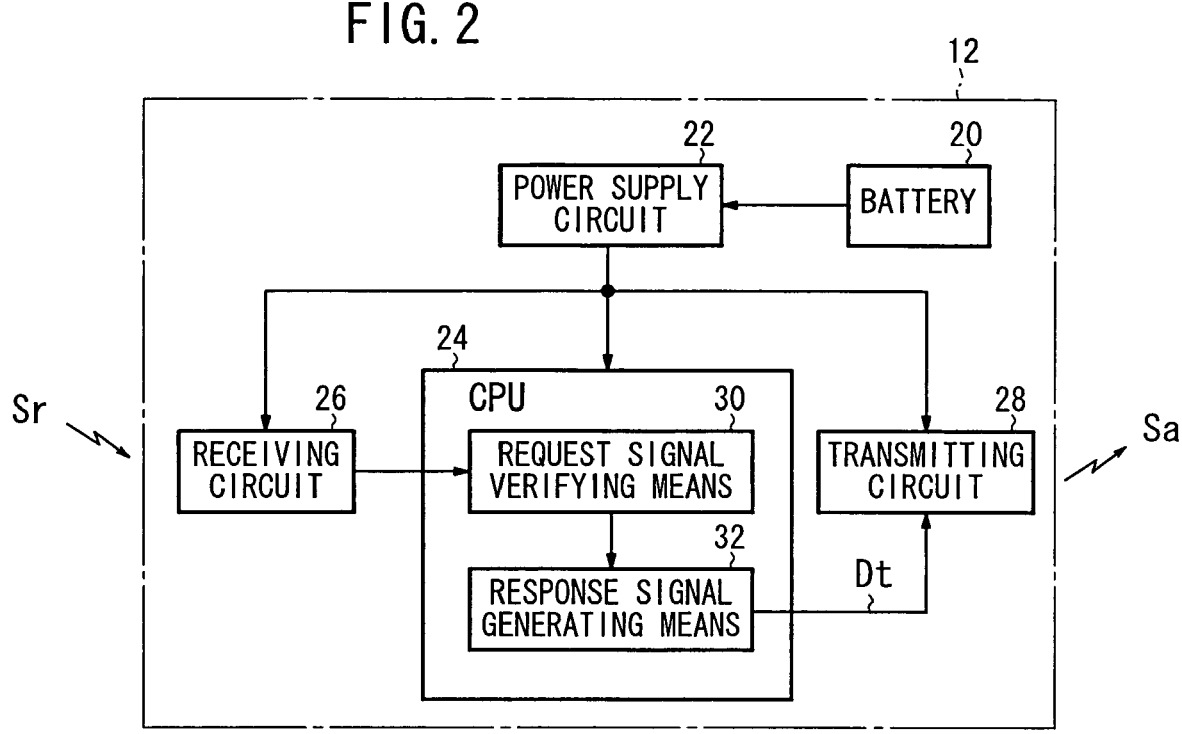
FIG. 2 is a schematic block diagram showing a construction of an electronic key in the electronic key system according to the first embodiment.

Subsequently, referring to FIG. 12 and FIG. 13, an electric key system 10B according to a second embodiment will be described. Members or units corresponding to FIG. 2 and FIG. 3 are represented by the same reference numerals and will not be described again.

Figure 12:
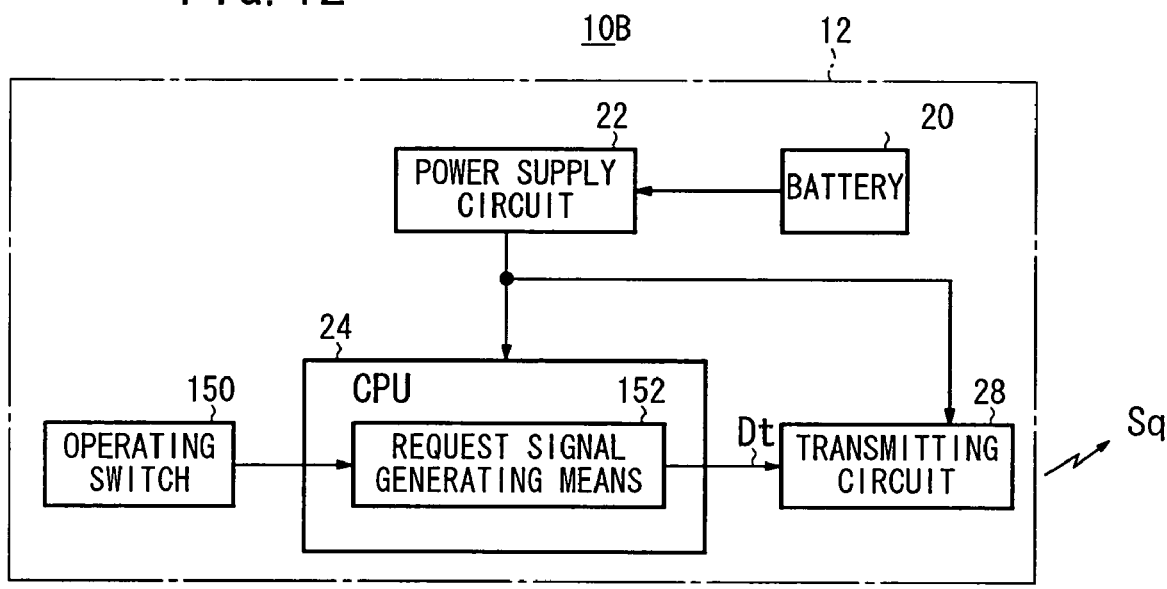
FIG. 12 is a schematic block diagram showing a construction of an electronic key in an electronic key system according to a second embodiment.

An electronic key 12 of the electronic key system 10B according to the second embodiment is, as shown in FIG. 12, constructed in almost the same manner as the electronic key 12 according to the first embodiment (See FIG. 2), but differs in that an operating switch 150 is provided.

A CPU 24 performs at least one step (a request signal generating routine 152). The request signal generating routine 152 is activated based on the turning ON operation of the operating switch 150. The request signal generating routine 152 reads ID data stored in a ROM, not shown, adds an attribute indicating response to the ID data, and outputs it to a transmitting circuit 28 as transmitting data Dt. The transmitting circuit 28, which includes a transmitting antenna, modulates a carrier wave based on the transmitting data Dt supplied from the CPU 24, and transmits it to a request signal Sq through the transmitting antenna. The frequency of the carrier wave of the request signal Sq may be from 200 MHz to 500 MHz.

Figure 13:
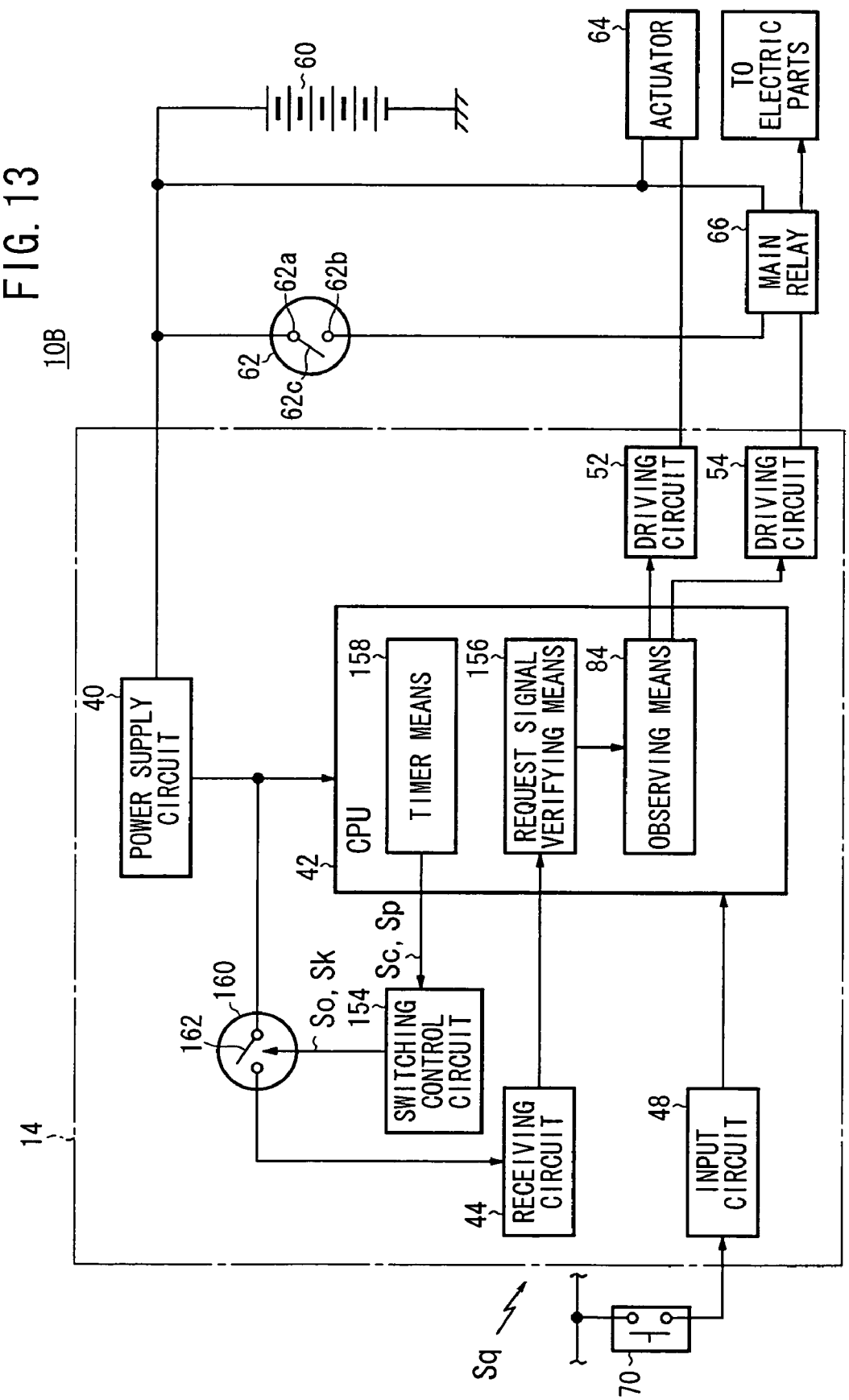
FIG. 13 is a schematic block diagram showing a construction of a control unit in the electronic key system according to a second embodiment.

On the other hand, as shown in FIG. 13, a control unit 14 may be mounted on the specific vehicle 100A or 100B and has substantially the same construction as the control unit 14 according to a first embodiment (See FIG. 3) described above, but differs in that the transmitting circuit 46 and the transmitting antenna 72 do not exist, there is a switching circuit 160 for selectively stopping supply of electric power to the receiving circuit 44, and there is a switching control circuit 154 for outputting a turning ON signal So and an intermittent pulse signal Sk to the switching circuit 160 to control ON and OFF the switching circuit 160 is provided.

The receiving circuit 44 includes a receiving antenna, not shown, which receives a request signal Sq or the like transmitted from the electronic key 12 through the receiving antenna, then takes the request signal out from the carrier wave and demodulates the same. The demodulated signal is supplied to the CPU 42.

The CPU 42 performs at least three steps (a request signal verifying routine 156, an observing routine 84, and a timer routine 158).

The request signal verifying routine 156 verifies whether or not the signal supplied from the receiving circuit 44 is the request signal Sq, and when it is verified that the signal is the request signal Sq, verifies whether or not ID data included in the request signal Sq is identical to the ID data registered in a memory, not shown.

The observing routine 84 observes the presence of arrival of the request signals Sq (whether or not conformity of ID was detected by the request signal verifying routine 156). When the request signal Sq from the electronic key 12 carried by the qualified is detected, an unlock signal is supplied to the first driving circuit 52 to release the locked state of the handle bar 102 and the seat 108, and the second driving circuit 54 is turned ON. Subsequently, when the main relay 66 is turned ON by the main switch 62 being turned ON, the engine starts and the specific vehicle is enabled to travel.

When the main switch 62 is turned OFF, the main relay 66 is also turned OFF and thus the engine is stopped simultaneously. At this time, the second driving circuit 54 is turned OFF.

The timer routine 158 outputs a continuation instruction signal Sc to the switching control circuit 154 when the start switch 70 is turned ON, during a period in which the main switch 62 is in ON-state, and during a period from the time point when the main switch 62 is turned OFF to the time point when the timer means 158 counts a predetermined value.

When timer routine 158 also outputs an intermittent instruction signal Sp to the switching control circuit 154 at the stage where it has started to count a reference clock supplied from a clock generator, not shown, from the time point when the main switch 62 is turned OFF, and counted to a predetermined value (for example, a period of two days, a week, and so on).

The switching control circuit 154 outputs the turn ON signal So to the switching circuit 160 during period in which the continuation instruction signal Sc is supplied from the timer routine 158. The switching circuit 160 turns a switch 162 ON based on the turn ON signal So supplied, and accordingly, power supplied to the receiving circuit 44 is constant.

At the time point when the intermittent instruction signal Sp is supplied from the timer routine 158, the switching control circuit 154 generates an intermittent pulse signal Sk, of which the attribute is switched to ON and OFF intermittently, and output it to the switching circuit 160. The switching circuit 160 repeats ON operation and OFF operation based on the supplied intermittent pulse signal Sk. Accordingly, power supplied to the receiving circuit 44 is intermittent and thus the control unit 14 is transferred into a power saving mode.

When the start switch 70 is turned ON in this power saving mode, the continuation instruction signal Sc is outputted to the switching control circuit 154 from the timer routine 158, whereby power supplied to the receiving circuit 44 is constant.

In the electronic key system 10B according to a second embodiment, when the specific vehicle 100A or 100B are not actuated for a predetermined period, power supplied to the receiving circuit 44 is made intermittent until the start switch 70 is turned ON thereafter. Therefore, power consumption during standby is reduced.

Figure 14:
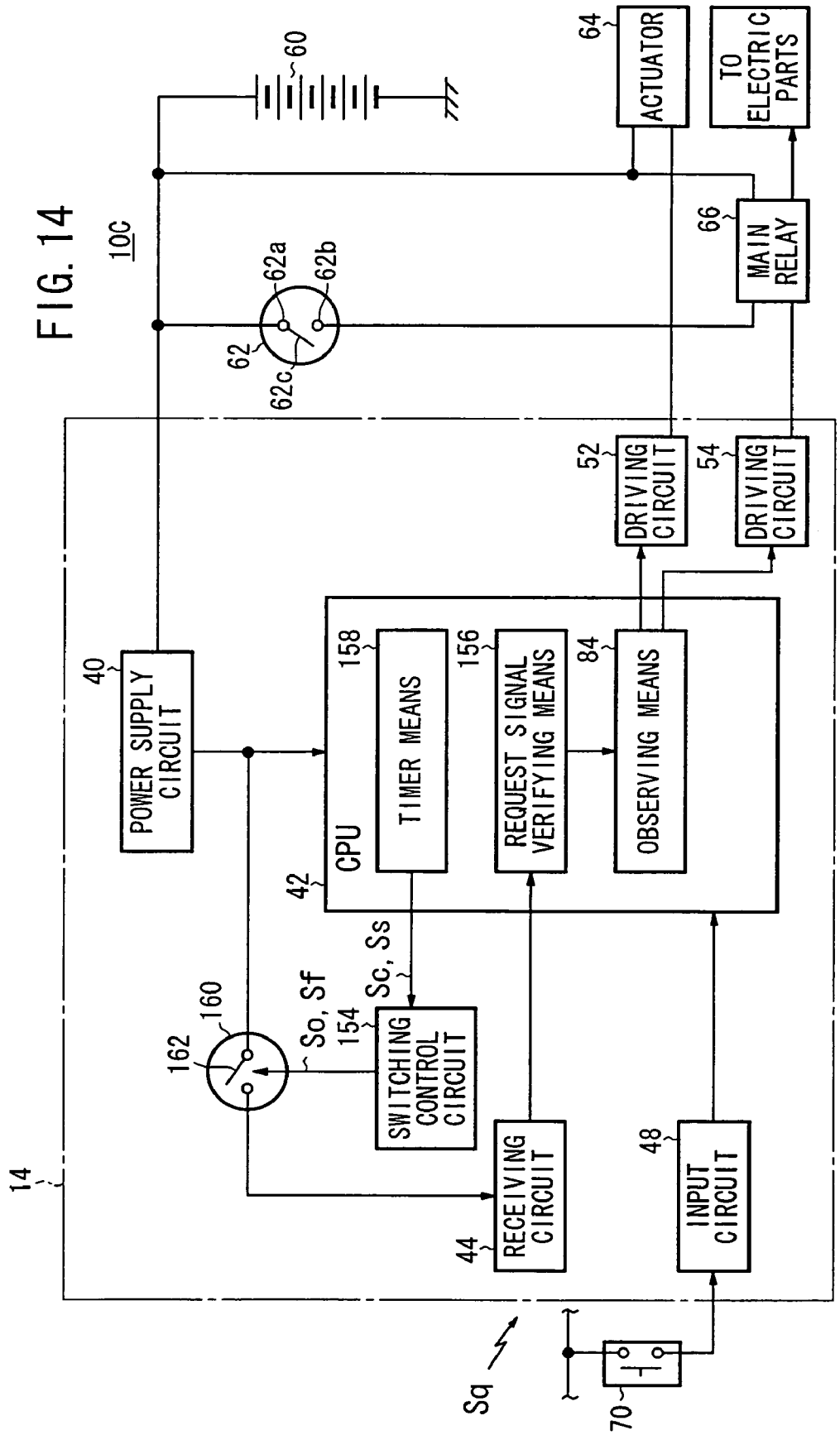
FIG. 14 is a schematic block diagram showing a construction of a control unit in an electronic key system according to a third embodiment.

Referring now to FIG. 14, an electronic key system 10C according to a third embodiment will be described. The members and units corresponding to FIG. 13 will be represented by the same reference numerals and will not be described again.

An electronic key 12 used in an electronic key system 10C according to a third embodiment is the same as an electronic key 12 according to a second embodiment described above (See FIG. 12).

A control unit 14 has substantially the same construction as the control unit 14 according to a second embodiment (See FIG. 13), but differs in that a turn ON signal So and a turn OFF signal Sf are supplied from a switching control circuit 154.

In other words, a timer routine 158 outputs a continuation instruction signal Sc to the switching control circuit 154 when a start switch 70 is turned ON, during a period in which a main switch 62 is in ON-state, and during a period from the time point when the main switch 62 is turned OFF to the time point when the timer routine 158 counts a predetermined value.

The timer routine 158 also outputs a stop instruction signal Ss to the switching control circuit 154 at the stage where it started to count a reference clock supplied from a clock generator, not shown, which is the time point when the main switch 62 is turned OFF, and until a predetermined value is counted.

The switching control circuit 154 outputs the turn ON signal So to the switching circuit 160 during the period in which the continuation instruction signal Sc is supplied from the timer routine 158, and accordingly, power supplied to the receiving circuit 44 is constant.

At the time point when the stop instruction signal Ss is supplied from the timer routine 158, the switching control circuit 154 supplies a turn OFF signal Sf. The switching circuit 160 turns the switch 162 OFF based on the supplied turn OFF signal Sf, whereby power supplied to the receiving circuit 44 is completely stopped.

When the start switch 70 is turned ON during a period in which power supplied to the receiving circuit 44 is stopped, the continuation instruction signal Sc is supplied from the timer routine 158 to the switching control circuit 154, whereby power supplied to the receiving circuit 44 is constant.

In the electronic key system 10C according to a third embodiment, when the specific vehicle 100A or 100B is not actuated for a predetermined period, power is not supplied to the receiving circuit 44 at all until the start switch 70 is turned ON thereafter. Therefore, power consumption during standby is significantly reduced.

In addition, it is also effective for protecting against theft because communication with the outside (communication with an electronic key 12) is not performed unless the predetermined start switch 70 is turned ON, and the start switch 70 cannot be found by a person other than the qualified user.

An electronic key system for a motorcycle of the present invention is not limited to the aforementioned embodiments, and various constructions may be applied without departing from the scope of the present invention, as a matter of course.

The invention claimed is:

1. An electronic key system for a motorcycle, said electronic key system comprising:
   a control unit mounted to a specific vehicle;
   a mobile transmitter-receiver carried by a user;
   a control mechanism for stopping power supplied at least to a circuit system of the control unit, which performs communication, when a specific vehicle is not actuated for a predetermined period;
   a power supply for supplying power to the circuit system based on the turning-ON operation of a start switch;
   a specific vehicle comprising an openable and closable seat on which the user sits, and a locking unit for locking the seat against an opening operation until an unlock instruction is supplied;
   a control unit comprising:
   a signal generator for supplying a request signal to the mobile transmitter-receiver only after a turning-ON operation of the start switch installed in the seat;
   a signal detector for detecting a response signal based on the request signal transmitted from the mobile transmitter-receiver; and
   a control mechanism for supplying an unlock instruction to the locking unit when it is identified that a request is fed from a qualified user as a result of verification of the response signal.

2. An electronic key system for a motorcycle according to claim 1, characterized in that an operating element of the start switch is provided so as to oppose the back surface of the superficial skin of the user's seat on a specified vehicle.

3. An electronic key system for a motorcycle according to claim 2, characterized in that the operating element of the start switch is provided so as to oppose the back surface of the superficial skin on the side surface of the user's seat.

4. An electronic key system for a motorcycle according to claim 1, wherein said start switch includes an operating element which is activated by being manually engaged by a user.

5. An electronic key system for a motorcycle, said electronic key system comprising:
   a control unit mounted to a specific vehicle,
   a mobile transmitter that is carried by a user,
   a control mechanism for stopping power supplied at least to a circuit system of the control unit, which performs communication, when a specific vehicle is not actuated for a predetermined period,
   a power supply for supplying power to the circuit system based on the turning-ON operation of a start switch,
   a specific vehicle comprising:
   an openable and closable seat on which the user sits, and a locking unit for locking the seat against an opening operation until an unlock instruction is supplied,
   the mobile transmitter comprising a signal generator for supplying a request signal to the control unit based on the user's input;
   the control unit comprising:
   a receiver for receiving a request signal from the mobile transmitter only after a turning-ON operation of the start switch installed in the seat, and
   a control mechanism for supplying an unlock instruction to the locking unit when it is identified that a request is fed from a qualified user as a result of verification of the request signal.

6. An electronic key system for a motorcycle according to claim 5, characterized in that an operating element of the start switch is provided so as to oppose the back surface of the superficial skin of the user's seat.

7. An electronic key system for a motorcycle according to claim 6, characterized in that the operating element of the start switch is provided so as to oppose the back surface of the superficial skin on the side surface of the seat.

8. An electronic key system for a motorcycle according to claim 5, wherein said start switch includes an operating element which is activated by being manually engaged by a user.

9. An electronic key system for a motorcycle, comprising:
   a specific vehicle comprising:
   an openable and closable seat for supporting a user thereon, and a locking unit for locking the seat against an opening operation until an unlock instruction is supplied,
   a control unit mounted to the specific vehicle, a mobile transmitter that is carried by a user, the mobile transmitter comprising a signal generator for supplying a request signal to the control unit based on the user's input, a power supply for supplying power intermittently at least to a circuit system of the control unit, which performs communication, when the specific vehicle is not activated for a predetermined period, and wherein said power supply is operable for supplying power constantly to the circuit system based on the turning-ON operation of a start switch, wherein the control unit comprises:

a receiver for receiving a request signal from the mobile transmitter only after a turning-ON operation of the start switch installed in the seat, and a control mechanism for supplying an unlock instruction to the locking unit when it is identified that a request is fed from a qualified user as a result of verification of the request signal.

* * * * *